US011457186B2

(12) United States Patent
Ozawa

(10) Patent No.: US 11,457,186 B2
(45) Date of Patent: Sep. 27, 2022

(54) METHOD OF CONTROLLING PROJECTOR AND PROJECTOR

(71) Applicant: SEIKO EPSON CORPORATION, Tokyo (JP)

(72) Inventor: Takaaki Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/728,068

(22) Filed: Dec. 27, 2019

(65) Prior Publication Data
US 2020/0213568 A1 Jul. 2, 2020

(30) Foreign Application Priority Data

Dec. 28, 2018 (JP) .............................. JP2018-247364

(51) Int. Cl.
*H04N 9/31* (2006.01)

(52) U.S. Cl.
CPC ......... *H04N 9/3185* (2013.01); *H04N 9/3197* (2013.01)

(58) Field of Classification Search
CPC .... H04N 9/3185; H04N 9/3197; H04N 9/317; H04N 3/22
USPC ............... 348/744, 177; 382/167; 359/205.1; 353/70, 69
See application file for complete search history.

(56) References Cited

U.S. PATENT DOCUMENTS

| 6,974,217 | B2 * | 12/2005 | Kimura | ............... H04N 9/3185 353/69 |
| 8,812,053 | B2 * | 8/2014 | Osaka | .................. G03B 21/005 455/556.1 |
| 9,445,066 | B2 * | 9/2016 | Inoue | .................... H04N 9/3185 |
| 2004/0041985 | A1 * | 3/2004 | Kimura | ............... H04N 9/3185 353/70 |
| 2009/0033881 | A1 * | 2/2009 | Mihara | ................ H04N 9/3185 353/69 |
| 2010/0103386 | A1 * | 4/2010 | Kubota | .................. G03B 21/14 353/70 |

(Continued)

FOREIGN PATENT DOCUMENTS

| JP | 2004-077545 A | 3/2004 |
| JP | 2008-203426 A | 9/2008 |

(Continued)

*Primary Examiner* — John W Miller
*Assistant Examiner* — Sean N. Haiem
(74) *Attorney, Agent, or Firm* — Dority & Manning, P.A.

(57) ABSTRACT

The projector executes a detection step of detecting a rotational angle of the projector with respect to a horizontal direction, a determination step of determining a correction parameter of correcting a shape of an image to be projected based on the rotational angle detected, a correction step of correcting the shape of the image based on the correction amount determined in the determination step, and a projection step of projecting the image corrected in the correction step. In the determination step, a range of the installation angle at which the projector is installed is divided into a plurality of areas, which of the areas the rotational angle detected in the detection step belongs to is determined, and the correction parameter is determined based on a difference between the reference angle set in the area to which the rotational angle is determined to belong and the rotational angle detected.

10 Claims, 13 Drawing Sheets

(56) References Cited

U.S. PATENT DOCUMENTS

| | | | | |
|---|---|---|---|---|
| 2011/0128602 A1* | 6/2011 | Hamano | ............ | G02B 26/0841 |
| | | | | 359/205.1 |
| 2012/0140188 A1 | 6/2012 | Yasuda et al. | | |
| 2012/0214546 A1* | 8/2012 | Osaka | .................. | G03B 21/005 |
| | | | | 455/556.1 |
| 2014/0285776 A1* | 9/2014 | Inoue | ................... | H04N 9/3185 |
| | | | | 353/69 |
| 2015/0070663 A1* | 3/2015 | Watanuki | .............. | H04N 9/3188 |
| | | | | 353/70 |
| 2015/0110398 A1* | 4/2015 | Totsuka | ............... | H04N 1/6027 |
| | | | | 382/167 |
| 2019/0116356 A1* | 4/2019 | Matoba | .................. | G09G 5/377 |

FOREIGN PATENT DOCUMENTS

| | | |
|---|---|---|
| JP | 2012-118398 A | 6/2012 |
| JP | 2012-173378 A | 9/2012 |

* cited by examiner

| CORRECTION TABLE | |
|---|---|
| ANGLE DIFFERENCE $\gamma$ | CORRECTION PARAMETER |
| POSITIVE ANGLE DIFFERENCE (0°~45°) | |
| 0° | +A |
| +1° | +B |
| +2° | +C |
| +3° | +D |
| ⋮ | |
| +45° | +E |
| NEGATIVE ANGLE DIFFERENCE (−1°~−44°) | |
| −1° | −G |
| −2° | −H |
| −3° | −I |
| ⋮ | |
| −44° | −J |

FIG. 7

| CORRECTION TABLE | |
|---|---|
| ANGLE DIFFERENCE $\gamma$ | CORRECTION PARAMETER |
| POSITIVE ANGLE DIFFERENCE (0°~60°) | |
| 0° | +A |
| +1° | +B |
| +2° | +C |
| +3° | +D |
| ⋮ | ⋮ |
| +45° | +E |
| ⋮ | ⋮ |
| +60° | +F |
| NEGATIVE ANGLE DIFFERENCE (−1°~−60°) | |
| −1° | −G |
| −2° | −H |
| −3° | −I |
| ⋮ | ⋮ |
| −44° | −J |
| ⋮ | ⋮ |
| −60° | −K |

71c

METHOD OF CONTROLLING PROJECTOR AND PROJECTOR

The present application is based on, and claims priority from JP Application Serial Number 2018-247364, filed Dec. 28, 2018, the disclosure of which is hereby incorporated by reference herein in its entirety.

BACKGROUND

1. Technical Field

The present disclosure relates to a method of controlling a projector, and a projector.

2. Related Art

In the past, a projector corrects a distortion in a shape of a projection image in accordance with the installation state of the projector. In, for example, JP-A-2012-173378 (Document 1), the posture of the projector is detected by an acceleration sensor to correct a keystone distortion of the projection image based on the posture thus detected.

In recent years, reduction in size of projectors progresses, and use of the projectors increases not only at business, but also at home. Therefore, not only screens installed in advance, but also a variety of places such as a wall, the ceiling, or a floor in a room are assumed as a projection surface on which the projector projects an image. However, in Document 1, shape correction when installing the projector on a stage or a floor surface, and shape correction when hanging down the projector from the ceiling are only considered.

SUMMARY

An aspect of the present disclosure is directed to a method of controlling a projector including a detection step of detecting an installation angle of the projector with respect to a reference direction set in advance, a determination step of determining a correction amount of correcting a shape of an image to be projected by the projector based on the installation angle detected, a correction step of correcting the shape of the image based on the correction amount determined in the determination step, and a projection step of projecting the image corrected in the correction step, wherein in the determination step, a range of the installation angle at which the projector is installed is divided into a plurality of areas, which of the areas the installation angle detected in the detection step belongs to is determined, and the correction amount is determined based on a difference between the reference angle set in advance in the area to which the installation angle is determined to belong and the installation angle detected.

The method of controlling a projector described above may be configured such that in the determination step, when the area to which the installation angle is determined to belong moves from a first area to a second area adjacent to the first area, and when the installation angle is an angle within a range set in advance in the second area from the installation angle of a boundary between the first area and the second area, it is determined that the installation angle belongs to the first area.

The method of controlling a projector described above may be configured such that in the determination step, when the installation angle is changed, but a time set in advance does not elapse from when the installation angle becomes constant, the correction amount is determined based on the difference between the reference angle set in the area to which the installation angle belongs before the installation angle is changed and the installation angle detected.

The method of controlling a projector described above may be configured such that in the determination step, when the installation angle is changed, and a change in the installation angle is detected again in the detection step after the time set in advance elapses from when the installation angle becomes constant, which of the areas the installation angle detected belongs to is determined again, and the correction amount is determined based on the difference between the reference angle set in the area to which the installation angle is determined to belong and the installation angle detected.

The method of controlling a projector described above may be configured such that in the determination step, an angle at which the correction amount becomes 0 is defined as the reference angle in each of the areas.

The method of controlling a projector described above may be configured such that in the determination step, the correction amount is determined with reference to a table including a difference between the installation angle and the reference angle, and the correction amount corresponding to the difference in association with each other.

Another aspect of the present disclosure is directed to a projector including a detection section configured to detect an installation angle of the projector with respect to a reference direction set in advance, a determination section configured to determine a correction amount of correcting a shape of an image to be projected by the projector based on the installation angle detected, a correction section configured to correct the shape of the image based on the correction amount determined by the determination section, and a projection section configured to project the image corrected by the correction section, wherein the determination section divides a range of the installation angle at which the projector is installed into a plurality of areas, determines which of the areas the installation angle detected by the detection section belongs to, and determines the correction amount based on a difference between the reference angle set in advance in the area to which the installation angle is determined to belong and the installation angle detected.

BRIEF DESCRIPTION OF THE DRAWINGS

FIG. 5 is a diagram showing a correction table in a first embodiment.

FIG. 7 is a diagram showing a correction table in a second embodiment.

DESCRIPTION OF EXEMPLARY EMBODIMENTS

Figure 1:
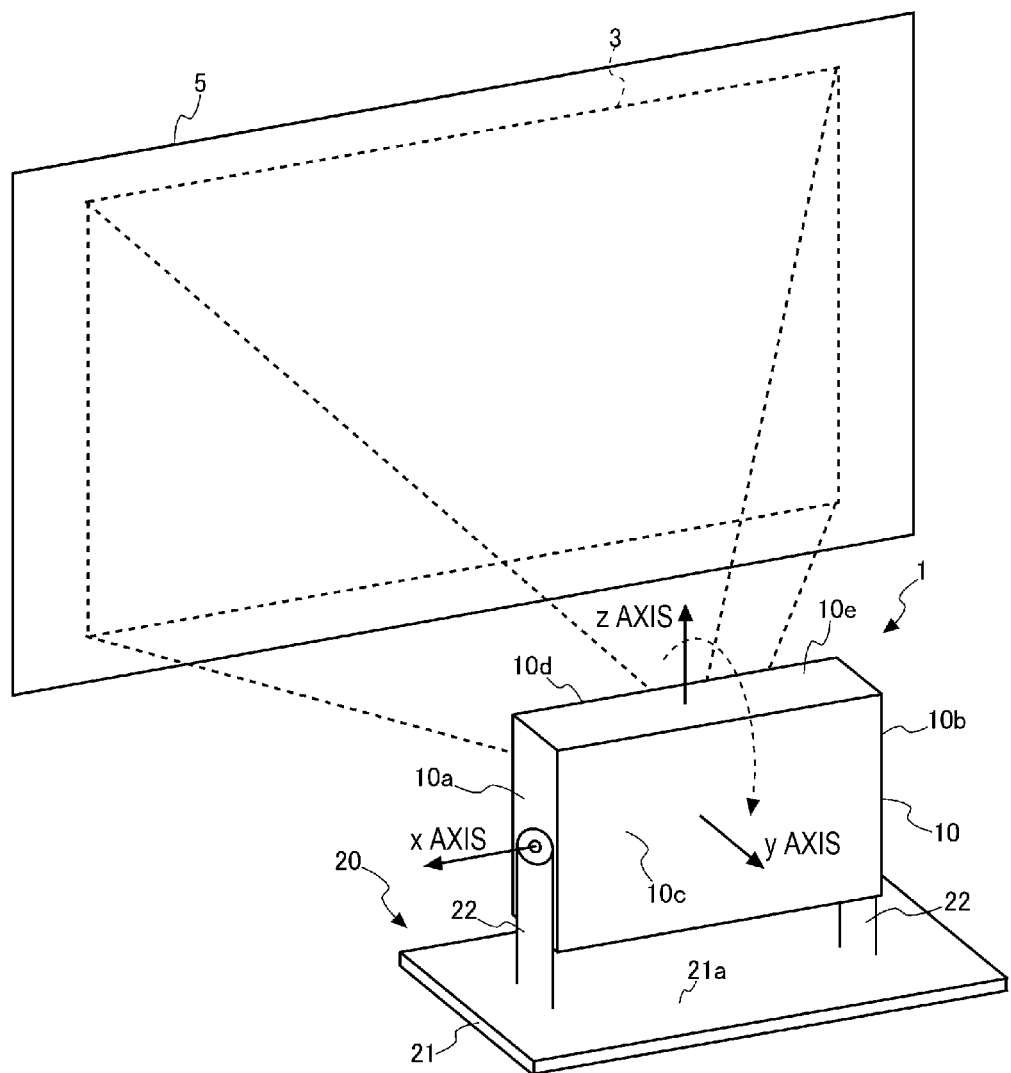
FIG. 1 is a perspective view showing an external appearance of a projector.
Figure 2:
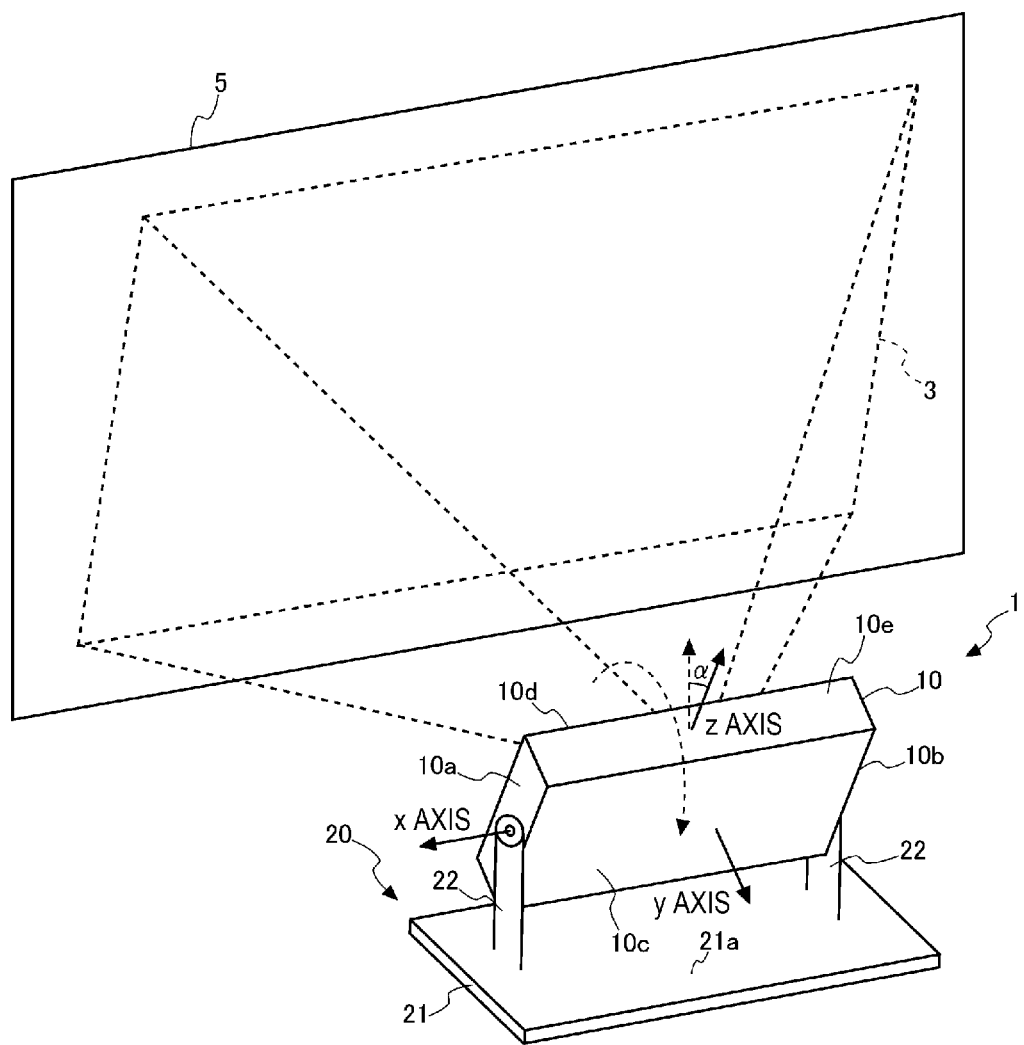
FIG. 2 is a perspective view showing an external appearance of the projector.

FIG. 1 and FIG. 2 are each a perspective view showing an external appearance of a projector 1.

The projector 1 is provided with a housing 10 for housing a device main body, and a support section 20 for supporting the housing 10. The housing 10 has a rectangular solid outer shape, and inside the housing 10, there are housed a projection system for forming and then projecting image light as an optical image, an image processing system for electrically processing image data as a source of the image light, a control section 70 for controlling these constituents, and so on. The support section 20 is a support member for supporting the housing 10, and is provided with a pedestal part 21 and legs 22.

Figure 3:
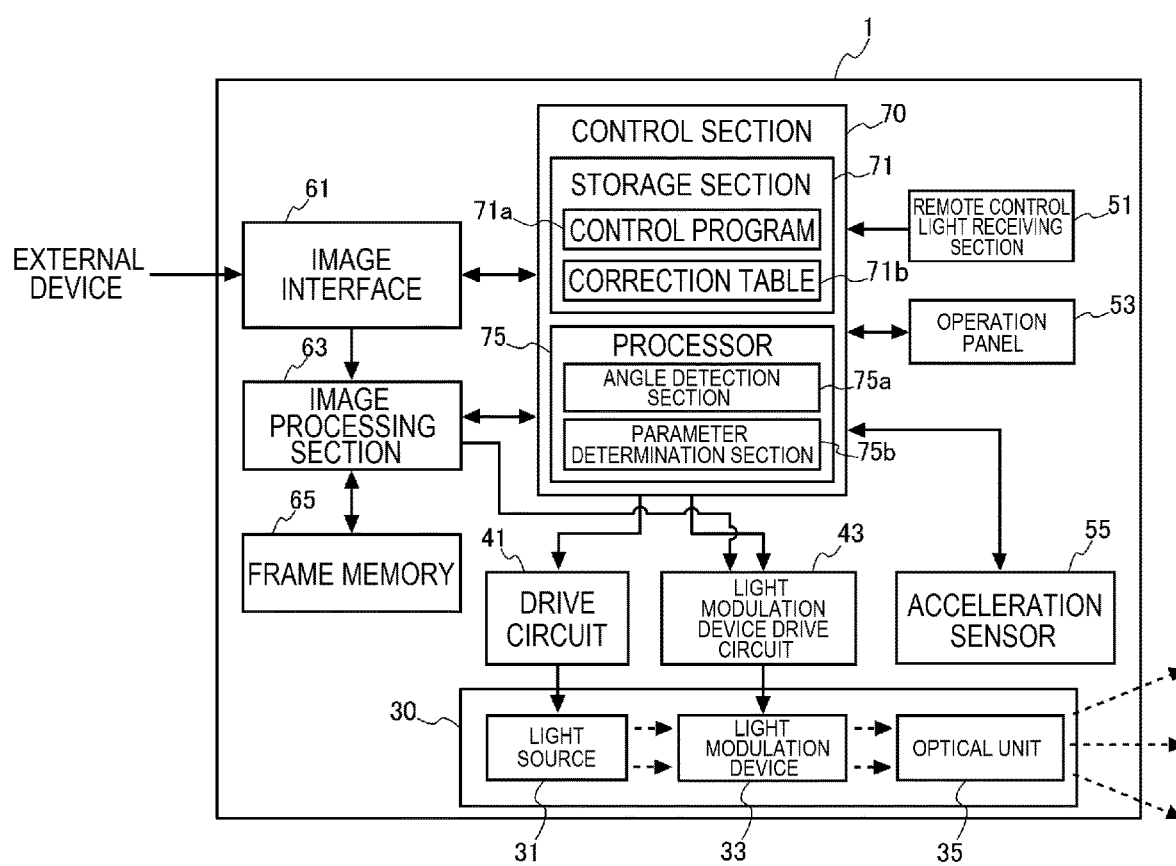
FIG. 3 is a functional block diagram showing a functional configuration of a projector.

The projector 1 is provided with an acceleration sensor 55 as shown in FIG. 3 described later to detect the acceleration in an x-axis direction, a y-axis direction, and a z-axis direction. The x-axis direction is a direction parallel to a normal line of side surfaces 10a, 10b of the housing 10. The x-axis direction is also a direction parallel to a rotational axis of the housing 10 which is supported by the support section 20, and rotates. The y-axis direction is a direction parallel to a normal line of a back surface 10c of the housing 10. The back surface 10c is a rear surface on an opposite side to a front surface 10d on which a projection lens for projecting an image is exposed. The projection lens is omitted from the illustration. The z-axis direction is a direction parallel to a normal line of an upper surface 10e of the housing 10.

The support section 20 is provided with the pedestal part 21 and the legs 22. The pedestal part 21 functions as a pedestal of the legs 22 and the housing 10 supported by the legs 22, and the legs 22 are fixed to an upper surface 21a of the pedestal part 21. The legs 22 are fixed to the pedestal part 21 and the side surfaces 10a, 10b of the housing 10, and rotatably support the housing 10. The housing 10 is supported by the legs 22, and can rotate 360° around the x axis as a rotational axis. FIG. 1 shows when the z axis as the normal direction of the upper surface 10e faces to a vertical direction, and FIG. 2 shows when the z axis is tilted as much as an angle α with respect to the vertical direction.

FIG. 3 is a functional block diagram showing a functional configuration of the projector 1.

The configuration of the projector 1 will be described with reference to FIG. 3. The projection system is provided with a projection section 30. The projection section 30 is provided with a light source 31, a light modulation device 33, and an optical unit 35.

As the light source 31, there is used a lamp such as a halogen lamp, a xenon lamp, or a super high-pressure mercury lamp. Further, as the light source 31, it is also possible to use a solid-state light source such as an LED (Light Emitting Diode) or a laser source.

Further, to the light source 31, there is coupled a drive circuit 41. The drive circuit 41 is coupled to the light source 31 and the control section 70, and supplies the light source 31 with a drive current or a pulse in accordance with the control by the control section 70 to put the light source 31 on or off.

The light modulation device 33 is provided with a light modulation element for modulating light emitted by the light source 31 to generate the image light. As the light modulation element, it is possible to use, for example, a transmissive liquid crystal light valve, a reflective liquid crystal light valve, or a digital mirror device. The light modulation device 33 emits the image light generated by the light modulation element to the optical unit 35.

To the light modulation device 33, there is coupled a light modulation device drive circuit 43. The light modulation device drive circuit 43 is coupled to the control section 70 and the light modulation device 33, and drives the light modulation device 33 in accordance with the control by the control section 70 to draw an image on the light modulation element frame by frame. For example, when the light modulation device 33 is formed of a liquid crystal light valve, the light modulation device drive circuit 43 is formed of a driver circuit for driving the liquid crystal.

The optical unit 35 is provided with an optical element such as a lens or a mirror, and projects the image light modulated by the light modulation device 33 toward the projection surface 5. Thus, the image based on the image light is imaged on the projection surface 5. The image based on the image light imaged on the projection surface 5 is referred to as a projection image 3. The projector 1 according to the present embodiment has a configuration in which the housing 10 rotates 360° around the x axis. Therefore, by rotating the housing 10, it is possible to use the wall, the ceiling, or the floor in the room as the projection surface 5.

The projector 1 is provided with a remote control light receiving section 51, an operation panel 53, and an acceleration sensor 55.

The remote control light receiving section 51 receives an infrared signal transmitted by a remote controller. The remote control light receiving section 51 outputs an operation signal corresponding to the infrared signal thus received to the control section 70. The operation signal is a signal corresponding to an operation of a switch of the remote controller operated by an operator.

The operation panel 53 is disposed in, for example, the housing 10, and is provided with a variety of switches. When a switch of the operation panel 53 is operated, the operation signal corresponding to the switch thus operated is input to the control section 70. Although a configuration of providing the projector 1 with the operation panel 53 is described in the present embodiment, when reducing the size of the projector 1, it is also possible to adopt a configuration in which all of the functions provided to the projector 1 can be operated by the remote controller without providing the operation panel 53 to the housing 10.

The acceleration sensor 55 detects the acceleration in three axis directions perpendicular to each other, namely the x axis, the y axis, and the z axis. The acceleration sensor 55 outputs the acceleration in the three axis directions thus detected to the control section 70. The control section 70 makes a storage section 71 described later store the acceleration in the three axis directions thus input. The acceleration sensor 55 functions as an example of a "detection section" in the present disclosure together with the control section 70 described later.

Then, an image processing system of the projector 1 will be described.

As the image processing system, the projector 1 is provided with an image interface 61, an image processing section 63, a frame memory 65, and the control section 70.

The image interface 61 is an interface to which the image data is input, and is provided with a connector to which a cable not shown is coupled, and an interface circuit for receiving the image data via the cable. The image interface 61 outputs the image data thus received to the image processing section 63.

To the image interface 61, there is coupled an external device for supplying the projector 1 with the image data. As the external device, there is used, for example, a notebook PC (Personal Computer), a desktop PC, a tablet terminal, a smartphone, a video reproduction device, a DVD player, and a Blu-ray player. Blu-ray is a registered trademark.

Further, it is also possible for the image interface 61 to have a configuration to which an STB (Set-Top Box) terminal for enjoying provision of a service such as VOD (Video On Demand) can directly be coupled.

Further, it is also possible to wirelessly couple the projector 1 and the external device to each other. For example, it is also possible to provide the projector 1 with a wireless communication section for performing the wireless communication in accordance with a communication standard such as Wi-Fi or Bluetooth. Wi-Fi and Bluetooth are registered trademarks.

To the image processing section 63, there is coupled a frame memory 65. The image processing section 63 and the frame memory 65 can be formed of, for example, an integrated circuit. In the integrated circuit, there are included an LSI (Large-Scale Integrated circuit), an ASIC (Application Specific Integrated Circuit), a PLD (Programmable Logic Device), an FPGA (Field-Programmable Gate Array), an SoC (System-on-a-Chip), and so on. Further, an analog circuit can also be included in a part of the configuration of the integrated circuit.

The image processing section 63 functions as an example of a "correction section" in the present disclosure. The image data having been input from the image interface 61 is developed in the frame memory 65 by the image processing section 63. The image processing section 63 performs image processing on the image data having been developed in the frame memory 65. In the image processing performed by the image processing section 63, there are included, for example, a shape correction process for correcting a distortion of the projection image 3, a resolution conversion process, a resizing process, and an adjustment process of the color shade or the luminance of the image. The image processing section 63 executes the process designated by the control section 70, and executes the process as needed using a parameter input from the control section 70. Further, it is obviously possible for the image processing section 63 to execute two or more of the processes described above in combination with each other. The image processing section 63 retrieves the image data on which the image processing has completely been executed from the frame memory 65, and then outputs the image data to the light modulation device drive circuit 43.

The control section 70 is provided with the storage section 71. The storage section 71 is provided with a ROM (Read Only Memory) and a RAM (Random Access Memory). Further, it is also possible for the storage section 71 to be provided with a semiconductor memory such as an eMMC (embedded Multi Media Card) or a SSD (Solid State Drive), or an HDD (Hard Disk Drive) as an auxiliary storage section. In this case, it is also possible to dispose the auxiliary storage section outside the control section 70.

The storage section 71 stores a control program 71a such as an OS and an application program to be executed by a processor 75. Further, the storage section 71 temporarily stores the acceleration detected by the acceleration sensor 55. Further, the storage section 71 stores a correction table 71b. The correction table 71b is a table in which a correction parameter to be used in the shape correction process to be executed by the image processing section 63 is registered. The correction parameter corresponds to an example of a "correction amount" in the present disclosure. Further, the correction table 71b corresponds to a "table" in the present disclosure. The shape correction process to be executed by the image processing section 63 is specifically a process for correcting a geometric distortion of the projection image 3. The correction parameter is a parameter for correcting the distortion in the horizontal direction of the projection image 3.

When the optical axis of the projection lens provided to the optical unit 35 is not parallel to the normal line of the projection surface 5, namely when the projector 1 is installed so as to be tilted with respect to the projection surface 5, there occurs a so-called keystone distortion that the projection image 3 is distorted to have a trapezoidal shape. Therefore, the projector 1 performs a geometric distortion correction such as the keystone distortion correction for performing conversion into a trapezoidal shape in an opposite direction to the trapezoidal distortion caused in the projection image 3. By performing the shape correction process, the projection image 3 turns to an image having a rectangular shape in which the distortion is suppressed.

The control section 70 is provided with a processor 75. The processor 75 is an arithmetic processing device formed of, for example, a CPU (Central Processing Unit), a DSP (Digital Signal Processor), or a microcomputer. Further, the processor 75 can be formed of a single processor, or can also be formed of a combination of a plurality of processors.

The control section 70 is provided with an angle detection section 75a and a parameter determination section 75b as a functional block. The functional block denotes a block obtained by sectioning the functions of the processor 75 which are realized by the processor 75 executing the control program 71a, and include calculation, control, and so on performed by the processor 75 function by function.

The angle detection section 75a retrieves the acceleration in the three axis directions detected by the acceleration sensor 55 from the storage section 71. The angle detection section 75a calculates the rotational angle θ of the housing 10 based on the acceleration thus retrieved. The present embodiment sets the horizontal direction as the reference direction, and obtains the rotational angle θ of the housing 10 from the horizontal direction based on the acceleration. The rotational angle θ can be calculated based on, for example, the acceleration in the directions of the y-axis and the z-axis perpendicular to the x axis as the rotational axis. The angle detection sensor 75a functions as an example of the "detection section" in the present disclosure together with the acceleration sensor 55. Further, the rotational angle θ calculated by the angle detection section 75a corresponds to an example of an "installation angle" in the present disclosure. Further, the present embodiment will be described using when the reference direction is the horizontal direction as an example, as the reference direction, it is possible to use an arbitrary direction such as a vertically downward direction or a vertically upward direction.

The parameter determination section 75b functions as an example of a "determination section" in the present disclosure. When the rotational angle θ is calculated by the angle detection section 75a, the parameter determination section 75b determines which one of the first area 81 through the fourth area 84 the rotational angle θ calculated belongs to. The first area 81, the second area 82, the third area 83, and the fourth area 84 are the areas obtained by dividing 360° as the range in which the housing 10 can rotate into four. Although there is described when 360° as the rotational range of the housing 10 is divided into the four areas, namely the first area 81, the second area 82, the third area 83, and the fourth area 84 in the present embodiment, the number of the areas thus divided into can be two or three, or can also be five or more. Further, "360°" corresponds to a "range of the installation angle at which the projector can be installed" in the present disclosure.

Figure 4:
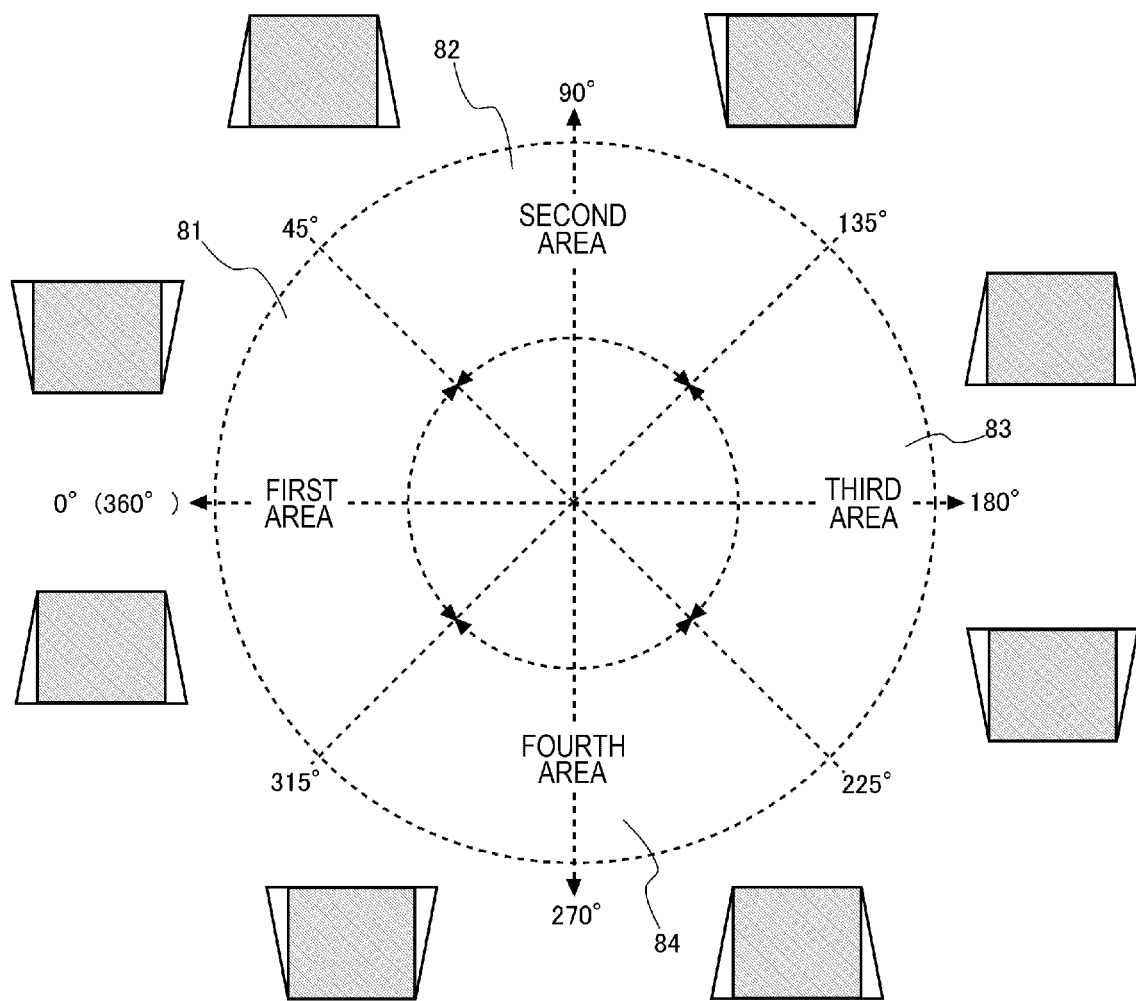
FIG. 4 is a diagram showing areas obtained by dividing an angle range in which a main body part can rotate into four.

FIG. 4 is a diagram showing the four areas obtained by dividing the angle range in which the housing 10 can rotate.

FIG. 4 shows the four areas obtained by dividing the angle range 360° into four defining when the housing 10 faces to the horizontal direction which is the reference direction as the reference of 0°. When the housing 10 faces to the horizontal direction is when the normal line of the upper surface 10e faces to the vertically upward direction, and the level of the housing 10 can be determined based on the acceleration in the z-axis direction. For example, when setting the positive direction of the z axis as the vertically upward direction, when the housing 10 is level, the acceleration in the z-axis direction becomes −1 G, or a value within a predetermined range from −1 G.

The first area 81 is a range of 315°<θ≤45°. Further, the second area 82 is a range of 45°<θ≤135°. Further, the third area 83 is a range of 135°<θ≤225°. Further, the fourth area 84 is a range of 225°<θ≤315°. The angle of θ=45° corresponds to an installation angle of a boundary between the first area 81 and the second area 82. Further, the angle of θ=135° corresponds to an installation angle of a boundary between the second area 82 and the third area 83. Further, the angle of θ=225° corresponds to an installation angle of a boundary between the third area 83 and the fourth area 84. Further, the angle of θ=315° corresponds to an installation angle of a boundary between the fourth area 84 and the first area 81.

The first area 81, the second area 82, the third area 83, and the fourth area 84 each correspond to an example of a "first area" or a "second area" in the present disclosure. For example, when the first area 81 corresponds to the "first area," the fourth area 84 and the second area 82 as areas adjacent to the first area 81 each correspond to the "second area" in the present disclosure. Further, when the second area 82 corresponds to the "first area," the first area 81 and the third area 83 as areas adjacent to the second area 82 each correspond to the "second area" in the present disclosure. Further, when the third area 83 corresponds to the "first area," the second area 82 and the fourth area 84 as areas adjacent to the third area 83 each correspond to the "second area" in the present disclosure. Further, when the fourth area 84 corresponds to the "first area," the first area 81 and the third area 83 as areas adjacent to the fourth area 84 each correspond to the "second area" in the present disclosure.

In each of the first area 81, the second area 82, the third area 83, and the fourth area 84, there is set a reference angle. The reference angle is an angle to be a reference of each area, and in the correction table 71b, there is registered the correction parameter in association with a difference between the reference angle and the rotational angle θ. In the present embodiment, the reference angle in the first area 81 is set to "0°" or "360°," and the reference angle in the second area 82 is set to "90°." Further, in the present embodiment, the reference angle in the third area 83 is set to "180°," and the reference angle in the fourth area 84 is set to "270°." The reference angle set in each of the first area 81, the second area 82, the third area 83, and the fourth area 84 is an angle at which the correction amount of the shape correction becomes "0." In other words, when the rotational angle θ is "0°," "90°," "180°," or "270°," the projector 1 determines that no distortion has occurred in the projection image, and does not perform the shape correction. Although there is shown when dividing the angle range in which the housing 10 can rotate into the four areas, and setting the angle to be the center of each of the areas thus divided into, or an angle around the angle as the reference angle in the present embodiment, the setting method of the reference angle can arbitrarily be changed.

When the rotational angle θ calculated by the angle detection section 75a is in the range of 315°<θ≤45°, the parameter determination section 75b determines that the rotational angle θ belongs to the first area 81. Similarly, when the rotational angle θ is in the range of 45°<θ≤135°, the parameter determination section 75b determines that the rotational angle θ belongs to the second area 82, and when the rotational angle θ is in the range of 135°<θ≤225°, the parameter determination section 75b determines that the rotational angle θ belongs to the third area. Further, when the rotational angle θ is in the range of 225°<θ≤315°, the parameter determination section 75b determines that the rotational angle θ belongs to the fourth area.

When the parameter determination section 75b has determined the area to which the rotational angle θ belongs, the parameter determination section 75b obtains the difference between the reference angle in the area to which the rotational angle θ has been determined to belong and the rotational angle θ. The parameter determination section 75b obtains the correction parameter corresponding to the difference thus obtained from the correction table 71b. The parameter determination section 75b outputs the correction parameter thus obtained to the image processing section 63.

FIG. 5 is a diagram showing a configuration of the correction table 71b.

The correction table 71b is a table in which an angle difference γ and the correction parameter corresponding to the angle difference γ are registered in association with each other. The angle difference γ is a difference between the rotational angle θ to be detected by the angle detection section 75a and the reference angle. Although there is shown when the angle difference γ is registered at intervals of 1° in the correction table 71b shown in FIG. 5, the values of the angle difference γ to be registered in the correction table are arbitrary. For example, it is possible to register the angle difference γ at intervals of 0.5°, or to register the angle difference γ at intervals of 5°. For example, when registering the angle difference γ at intervals of 5° and the correction parameter corresponding to the angle difference γ in the correction table 71b, the correction parameter corresponding to the angle difference γ not registered in the correction table 71b can be obtained by an interpolation calculation.

Further, the angle difference γ includes a positive angle difference γ and a negative angle difference γ. When the rotational angle θ detected by the angle detection section 75a is larger than the reference angle, the positive angle difference γ occurs. Further, when the rotational angle θ detected by the angle detection section 75a is smaller than the reference angle, the negative angle difference γ occurs. For example, when the rotational angle θ is 30°, the difference from 0° as the reference angle in the first area 81 becomes +30°, and the positive angle difference occurs. Further, when the rotational angle θ is 340°, the difference from 360° as the reference angle in the first area 81 becomes −20°, and the negative angle difference occurs.

Further, it is not true that the correction parameter corresponding to each of the first area 81 through the fourth area 84 is registered in the correction table 71b. By registering the angle difference γ and the correction parameter corresponding to the angle difference γ in association with each other to the correction table 71b, it is possible to make the correction table common to the first area 81 through the fourth area 84. The parameter determination section 75b calculates the angle difference γ from the reference angle regardless of which one of the first area 81 through the fourth area 84 the rotational angle determined belongs to, and then obtains the correction parameter corresponding to the angle difference γ thus calculated with reference to the correction table 71b.

The image processing section 63 corrects the shape distortion of the image data developed in the frame memory 65 using the correction parameter input from the control section 70. The image processing section 63 outputs the image data thus corrected to the light modulation device drive circuit 43. The light modulation device drive circuit 43 generates a drive signal for driving the light modulation element based on the image data thus input. The light modulation device drive circuit 43 drives the light modulation element with the drive signal thus generated to draw the image based on the image data on the light modulation element. The light emitted from the light source 31 passes through the light modulation element to thereby be modulated into the image light. The image light thus generated is projected on the projection surface 5 by the optical unit 35. Thus, the projection image 3 the shape distortion of which has been corrected is displayed on the projection surface 5.

Figure 6:
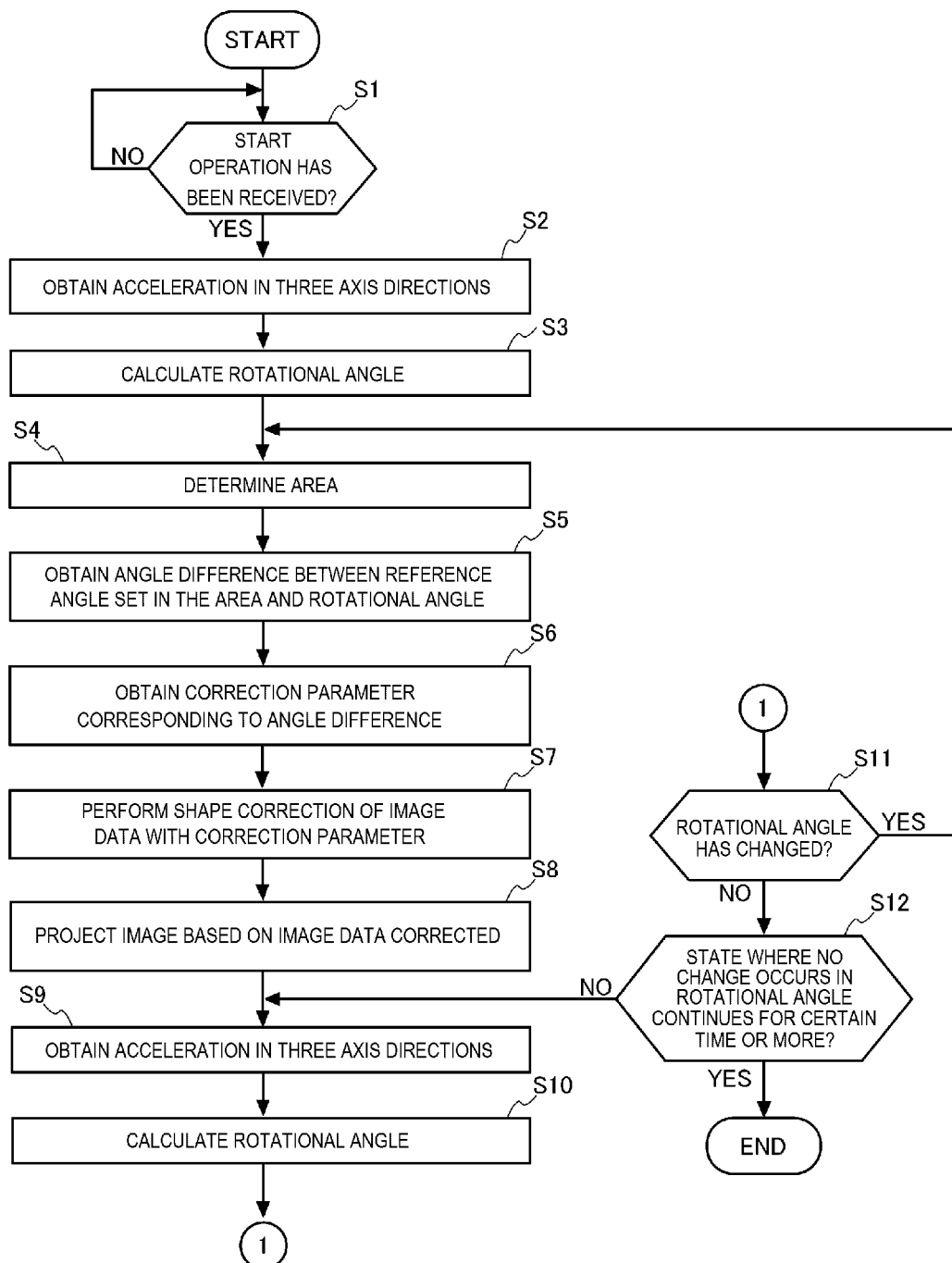
FIG. 6 is a flowchart showing an operation of a projector according to the first embodiment.

FIG. 6 is a flowchart showing an operation of the projector 1 according to the first embodiment.

The operation of the projector 1 according to the first embodiment will be described with reference to the flowchart shown in FIG. 6.

Firstly, the control section 70 determines (step S1) whether or not the operation of starting the shape correction process has been received. Although the description will be presented citing when the operator operates the remote controller or the like to start the shape correction process as an example in this flowchart, it is also possible to start the shape correction process when the projector 1 has been powered on, or when a start operation of the image projection has been received. When the control section 70 has not received the start operation of the shape correction process (NO in the step S1), the control section 70 stands ready to start the process until the control section 70 receives the start operation.

When the control section 70 receives the start operation of the shape correction process (YES in the step S1), the control section 70 retrieves the acceleration in the three axis directions from the storage section 71 to obtain (step S2) the acceleration. The acceleration sensor 55 detects the acceleration in the three axis directions at predetermined time intervals, and then outputs the acceleration in the three axis directions thus detected to the control section 70.

The control section 70 calculates (step S3) the rotational angle θ of the housing 10 based on the acceleration in the three axis directions thus obtained. The step S3 corresponds to an example of a "detection step" in the present disclosure. When the control section 70 calculates the rotational angle θ, the control section 70 determines (step S4) which one of the first area 81 through the fourth area 84 the rotational angle θ thus calculated belongs to.

When the control section 70 has determined the area to which the rotational angle θ belongs, the control section 70 obtains (step S5) the angle difference γ between the reference angle set in the area to which the rotational angle θ has been determined to belong, and the rotational angle θ. When the control section 70 obtains the angle difference γ, the control section 70 obtains (step S6) the correction parameter associated with the angle difference γ thus obtained with reference to the correction table 71b. The steps S5 and S6 correspond to an example of a "determination step" in the present disclosure. The control section 70 outputs the correction parameter thus retrieved to the image processing section 63 to make the image processing section 63 perform the shape correction process.

The image processing section 63 corrects the image data developed in the frame memory 65 using the correction parameter input from the control section 70 to perform (step S7) the shape correction process. The step S7 corresponds to an example of a "correction step" in the present disclosure. When the shape correction process ends, the image processing section 63 retrieves the image data the image shape of which has been corrected from the frame memory 65, and then outputs the image data to the light modulation device drive circuit 43. The light modulation device drive circuit 43 generates the drive signal based on the image data thus input, and then drives the light modulation element of the light modulation device 33. Thus, the light emitted from the light source 31 is modulated by the light modulation device 33 to generate the image light, and the image light thus generated is projected (step S8) by the optical unit 35. The step S8 corresponds to an example of a "projection step" in the present disclosure.

Further, the control section 70 retrieves subsequent acceleration in the three axis directions from the storage section 71 to obtain (step S9) the acceleration, and then calculates (step S10) the rotational angle θ based on the acceleration thus obtained. When the control section 70 calculates the rotational angle θ, the control section 70 compares the rotational angle θ thus calculated and the rotational angle θ previously calculated in the step S3 with each other to determine (step S11) whether or not the rotational angle θ has changed. When the rotational angle θ has changed (YES in the step S11), the control section 70 returns to the step S4 to determine the area to which the rotational angle θ thus calculated belongs.

Further, when no change has occurred in the rotational angle θ (NO in the step S11), the control section 70 determines (step S12) whether or not the state in which no change has occurred in the rotational angle θ continues for a certain time or more. When the state in which no change has occurred in the rotational angle θ does not continue for the certain time or more (NO in the step S12), the control section makes the transition to the step S9 to obtain the acceleration in the three axis directions, and then calculates (step S10) the rotational angle θ. Further, when the state in which no change has occurred in the rotational angle θ continues for the certain time or more (YES in the step S12), the control section 70 terminates the processing flow.

As described hereinabove, the projector 1 according to the first embodiment executes the detection step, the determination step, the correction step, and the projection step.

The detection step is a step of detecting the rotational angle θ with respect to the horizontal direction as the reference direction previously set as the installation angle of the projector 1. The detection step is a step executed by the acceleration sensor 55 and the angle detection section 75a of the control section 70.

Further, the determination step is a step of determining the correction parameter for correcting the shape of the image to be projected by the projector 1 based on the rotational angle θ of the projector 1 detected in the detection step. The determination step is a step executed by the parameter determination section 75b of the control section 70.

Further, the correction step is a step of correcting the shape of the image based on the correction parameter determined in the determination step. The correction step is a step to be executed by the image processing section 63.

Further, the projection step is a step of projecting the image corrected in the correction step. The projection step is a step executed by the control section 70 controlling the projection section 30.

Further, in the determination step, the range of the installation angle at which the projector 1 can be installed is divided into the four areas, namely the first area 81, the second area 82, the third area 83, and the fourth area 84, and which one of the four areas the rotational angle θ detected in the detection step belongs to is determined. Further, in the determination step, the correction parameter is determined based on the difference between the reference angle previously set in the area to which the rotational angle θ has been determined to belong, and the installation angle detected.

Therefore, it is possible to correct the shape of the image to be projected within the range of the installation angle at which the projector 1 can be installed.

Further, in the determination step, the angle at which the correction amount becomes θ is set to the reference angle in each of the first area 81, the second area 82, the third area 83, and the fourth area 84, and the correction parameter is determined based on the difference between the reference angle in the area to which the rotational angle θ has been determined to belong, and the rotational angle θ thus detected.

Therefore, it is possible to identify the correction parameter based on the difference between the rotational angle θ thus detected and the reference angle in all of the first area 81 through the fourth area 84.

Further, in the determination step, the correction parameter is determined with reference to the correction table 71b in which the difference between the rotational angle θ and the reference angle and the correction amount corresponding to the difference are associated with each other.

Therefore, it is possible to reduce the data amount to be registered in the correction table 71b and identify the correction parameter based on the difference between the rotational angle θ thus detected and the reference angle in all of the first area 81 through the fourth area 84.

Second Embodiment

A second embodiment will be described. It should be noted that since the configuration of the projector 1 according to the second embodiment is the same as that in the first embodiment shown in FIG. 1, the description of the detailed configuration of the projector 1 will be omitted.

FIG. 7 is a diagram showing a configuration of a correction table 71c in the second embodiment.

In the correction table 71c in the present embodiment, in addition to the angle difference γ and the correction parameter corresponding to the angle difference γ described in the first embodiment, an allowance angle difference, namely a margin angle difference γ, and the correction parameter corresponding to the margin angle difference γ are registered in association with each other.

For example, the range of the first area 81 is 315°<θ≤45°, and the reference angle is 0° or 360°. Therefore, the maximum value of the angle difference γ becomes 45°. However, in the correction table 71c, the value in a range of +45°≤(angle difference γ)≤+60° is also registered as a positive margin angle difference γ, and the correction parameter. Further, in the correction table 71c, the value in a range of −60°≤(angle difference γ)≤−45° is also registered as a negative margin angle difference γ, and the correction parameter.

Here, the reason that the margin angle difference γ, and the correction parameter are registered in the correction table 71c will be described.

For example, the description will be presented citing when the direction of the projector 1 gradually be changed to the upward direction to gradually increase the rotational angle θ as the angle from the horizontal direction as the reference direction as an example. By the rotational angle θ gradually increasing, the projection position of the projection image 3 gradually moves upward. When the margin angle difference γ and the correction parameter corresponding to the angle difference γ are not registered in the correction table 71c, when the rotational angle θ exceeds 45°, the parameter determination section 75b changes the area to which the rotational angle θ belongs from the first area 81 to the second area 82. Further, after the parameter determination section 75b changes the area to which the rotational angle θ belongs, to the second area 82, the parameter determination section 75b determines the correction parameter based on the negative angle difference γ in the second area 82. Until the rotational angle θ exceeds 90° as the reference angle in the second area 82, the parameter determination section 75b determines the correction parameter based on the negative angle difference γ in the second area 82.

Figure 8:
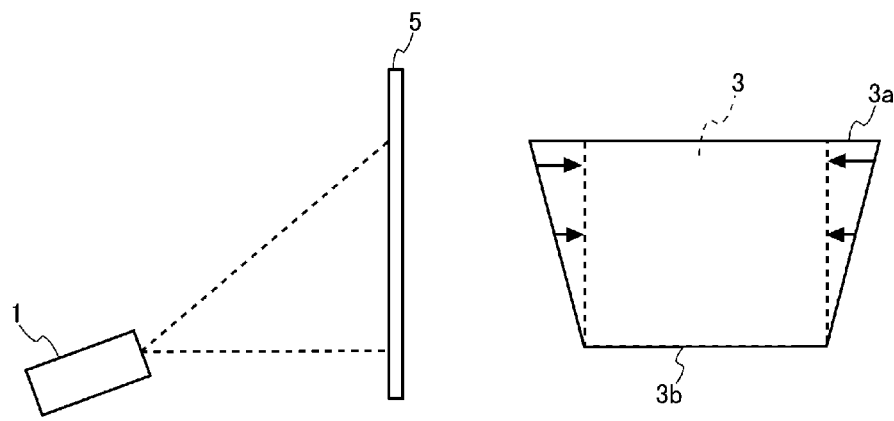
FIG. 8 is a diagram showing a projector, and a projection image of the projector.

FIG. 8 is a diagram showing the projector 1 and the projection image 3 of the projector 1. The projection image 3 to be displayed by the projector 1 enlarges as the distance from the projector 1 increases, and is displayed in an enlarged manner. Therefore, as shown in FIG. 8, when making the projector 1 project the image light obliquely upward, the length of an upper side 3a of the projection image 3 becomes longer than the length of a lower side 3b. Therefore, the projector 1 performs a correction of performing the conversion into a trapezoidal shape in the opposite direction to the trapezoidal distortion caused in the projection image 3 to perform a correction of shortening the length of the upper side 3a. The projection image 3 on which the shape correction has been performed is displayed in the range indicated by the dotted lines in FIG. 8. The correction parameter registered in the correction table 71c in association with the positive angle difference γ is a parameter for performing the correction of shortening the length of the upper side 3a of the image data representing the projection image 3.

Figure 9:
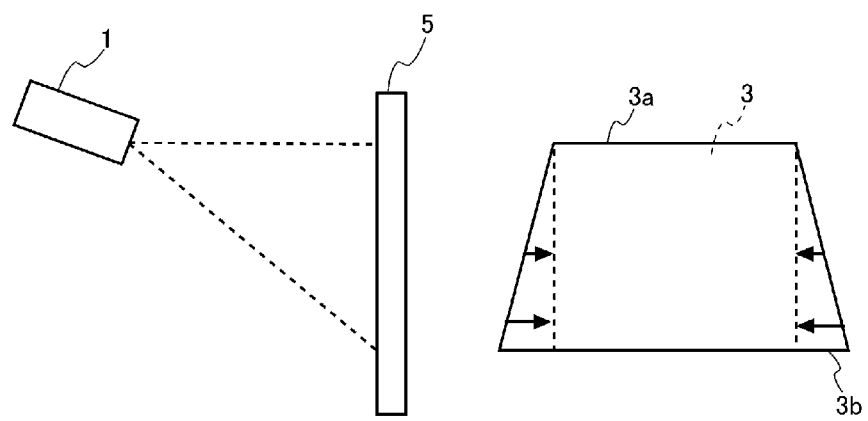
FIG. 9 is a diagram showing a projector, and a projection image of the projector.

FIG. 9 is a diagram showing the projector 1 and the projection image 3 of the projector 1.

Further, as shown in FIG. 9, when making the projector 1 project the image light obliquely downward, the length of the lower side 3b of the projection image 3 becomes longer than the length of the upper side 3a. In this case, the projector 1 performs a correction of shortening the length of the lower side 3b. The projection image 3 on which the shape correction has been performed is displayed in the range indicated by the dotted lines in FIG. 9. The correction parameter registered in the correction table 71c in association with the negative angle difference γ is a parameter for performing the correction of shortening the length of the lower side 3b of the image data representing the projection image 3.

When changing the correction parameter from the positive correction parameter to the negative correction parameter at the boundary between the areas, for example, 45°, there occurs switching from the correction of shortening the length of the upper side 3a to the correction of shortening the length of the lower side 3b, and thus, the shape of the projection image 3 is dramatically changed in some cases. Similarly, when changing the correction parameter from the negative correction parameter to the positive correction parameter at, for example, 45°, there occurs switching from the correction of shortening the length of the lower side 3b to the correction of shortening the length of the upper side 3a, and thus, the shape of the projection image 3 is dramatically changed in some cases.

In the present embodiment, the margin angle difference γ and the correction parameter corresponding to the margin angle difference γ are registered in the correction table 71c in association with each other so as to prevent the shape of the projection image 3 from being dramatically changed at the boundary between the areas as described above.

When the area to which the rotational angle θ detected by the angle detection section 75a belongs is moved from any one of the first area 81 through the fourth area 84 to another area adjacent thereto, the parameter determination section 75b firstly obtains the angle difference γ between the rotational angle θ thus detected and the reference angle in the area from which the area has moved. Then, the parameter determination section 75b determines whether or not the correction parameter corresponding to the angle difference γ thus obtained is registered in the correction table 71c. In other words, the parameter determination section 75b determines whether or not the angle difference γ thus obtained is the angle difference registered in the correction table 71c as the margin angle difference γ. When the angle difference γ thus obtained is the margin angle difference γ, the parameter determination section 75b obtains the correction parameter corresponding to the angle difference γ thus obtained from the correction table 71c. Further, when the angle difference γ thus obtained is not the margin angle difference γ, the parameter determination section 75b obtains the angle difference γ between the rotational angle θ thus detected and the reference angle in the area to which the area has moved, and then obtains the correction parameter corresponding to the angle difference γ thus obtained from the correction table 71c.

The range of the angle difference γ registered as the margin in the correction table 71c can arbitrarily be changed. For example, as the margin of the first area 81, it is possible to register the correction parameter in a range of +46°≤(angle difference γ)≤+90°, or the correction parameter in a range of −90°≤(angle difference γ)≤−46°. Further, it is also possible to register the correction parameter in a range of +46°≤(angle difference γ)≤+135°, or the correction parameter in a range of −135°≤(angle difference γ)≤−46° in the correction table 71c as the margin. The same applies to the second area 82, the third area 83, and the fourth area 84.

Further, the parameter determination section 75b can also be arranged not to change the area to which the rotational angle θ belongs and the reference angle in a period from when a motion of the projector 1 is detected to when it is determined that the motion of the projector 1 has stopped.

For example, when the parameter determination section 75b has firstly determined the first area 81 as the area to which the rotational angle θ detected by the angle detection section 75a belongs, the parameter determination section 75b obtains the correction parameter based on the angle difference γ between the rotational angle θ and the reference angle in the first area 81. In this case, for example, the correction parameter in a range of 0°≤(angle difference γ)≤+180° or the correction parameter in a range of −180°≤(angle difference γ)≤−1° is registered in advance in the correction table 71c so as to be able to cope with when the angle difference γ has increased.

By determining the correction parameter based on the reference angle in the same area until it is determined that the motion of the projector 1 has stopped, it is possible to prevent the shape of the projection image 3 from being dramatically changed.

When the rotational angle θ detected by the angle detection section 75a shows the same value, and the state in which no change in the rotational angle θ is detected continues for a certain time or more, the parameter determination section 75b determines that the motion of the projector has stopped. Then, the parameter determination section 75b resets the determination of the area to which the rotational angle θ belongs. Subsequently, when the rotational angle θ different in value has been detected by the angle detection section 75a, the parameter determination section 75b redetermines the area to which the rotational angle θ belongs based on the rotational angle θ thus detected. By redetermining the area to which the rotational angle θ belongs based on the rotational angle θ thus detected, it is possible to determine the appropriate area to which the rotational angle θ belongs, and thus, it is possible to correct the shape of the image with the appropriate correction parameter corresponding to the rotational angle θ.

Figure 10:
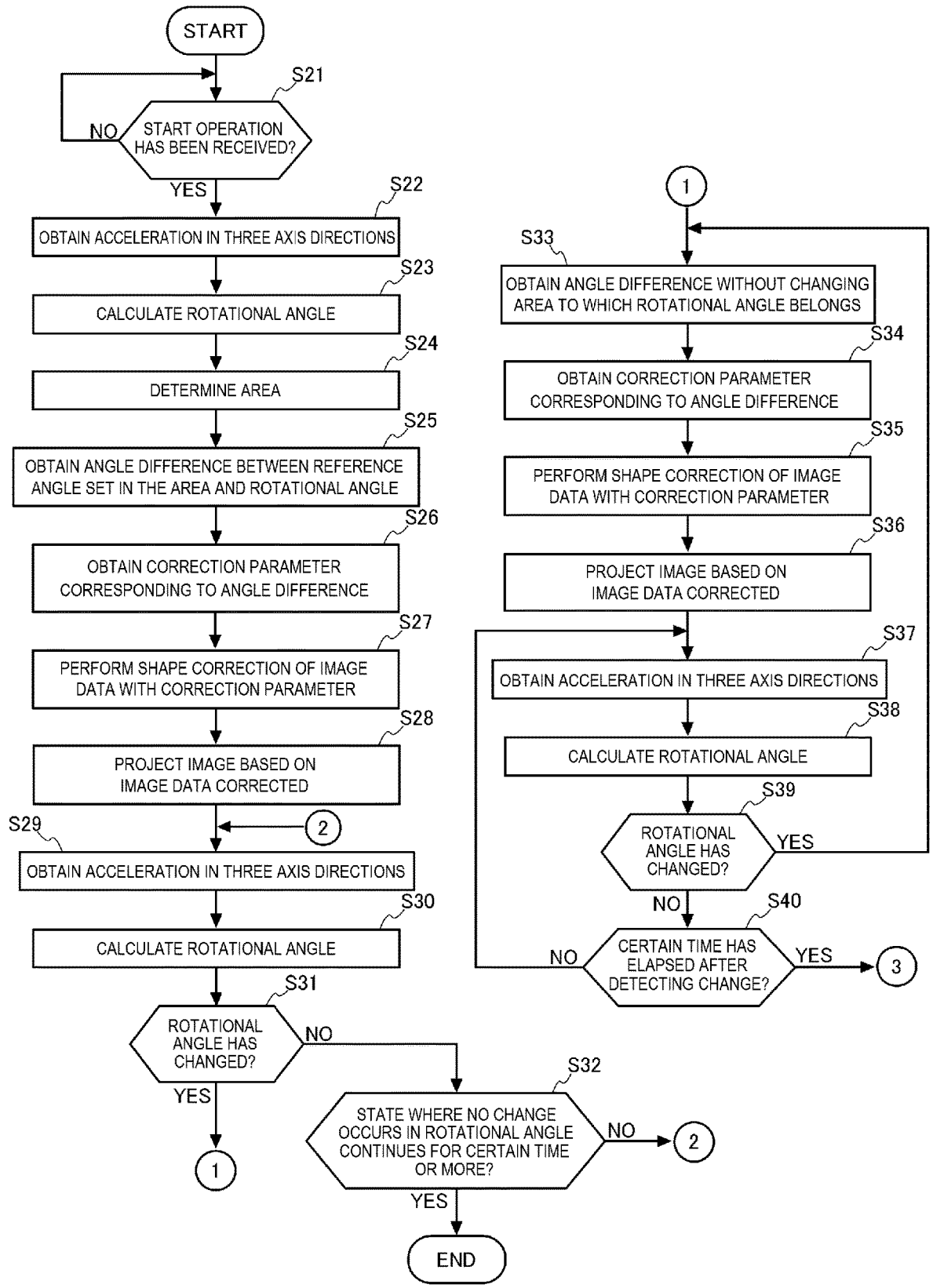
FIG. 10 is a flowchart showing an operation of a projector according to the second embodiment.
Figure 11:
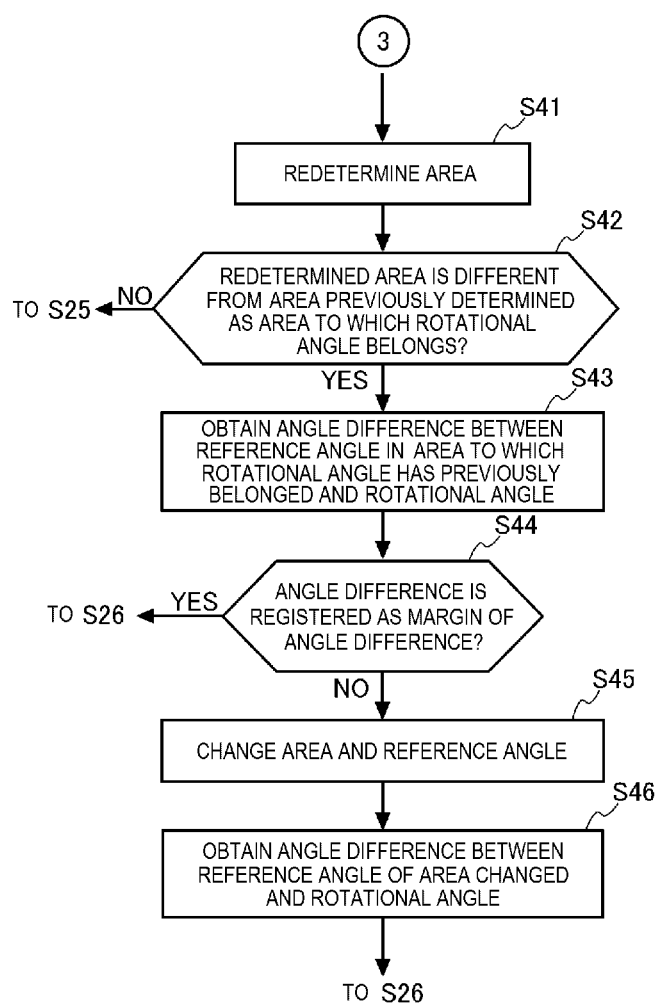
FIG. 11 is a flowchart showing an operation of the projector according to the second embodiment.

FIG. 10 and FIG. 11 are flowcharts showing an operation of the projector 1 according to the second embodiment. Since the processes in the steps S21 through S31 shown in FIG. 10 are the same as those in the steps S1 through S11 shown in FIG. 6, the description of the processes in the steps S21 through S31 will be omitted.

When the control section 70 calculates (step S30) the rotational angle θ, the control section 70 compares the rotational angle θ thus calculated and the rotational angle θ previously calculated in the step S23 with each other to determine (step S31) whether or not the rotational angle θ has changed. When no change has occurred in the rotational angle θ (NO in the step S31), the control section 70 determines (step S32) whether or not the state in which no change has occurred in the rotational angle θ has continued for a certain time or more. When the state in which no change has occurred in the rotational angle θ has continued for the certain time or more (YES in the step S32), the control section 70 terminates the processing flow. When the state in which no change has occurred in the rotational angle θ does not continue for the certain time or more (NO in the step S32), the control section 70 makes the transition to the step S29 to obtain the acceleration in the three axis directions, and then recalculates (step S30) the rotational angle.

Further, when a change in the rotational angle θ has been detected in the step S31 (YES in the step S31), the control section 70 does not change the area to which the rotational angle has been determined to belong in the step S24, but obtains (step S33) the angle difference γ between the reference angle set in the area to which the rotational angle θ belongs and the rotational angle θ calculated in the step S30. When the control section 70 obtains the angle difference γ, the control section 70 obtains (step S34) the correction parameter associated with the angle difference γ thus obtained with reference to the correction table 71c.

The control section 70 outputs the correction parameter thus retrieved to the image processing section 63 to make the image processing section 63 perform the shape correction process. The image processing section 63 corrects the image data developed in the frame memory 65 using the correction parameter input from the control section 70 to perform (step S35) the shape correction process. The image processing section 63 retrieves the image data on which the shape correction process has been performed, from the frame memory 65, and then outputs the image data to the light modulation device drive circuit 43. Thus, the light emitted from the light source 31 is modulated by the light modulation device 33 to generate the image light, and the image light thus generated is projected (step S36) by the optical unit 35.

Then, the control section 70 retrieves subsequent acceleration in the three axis directions from the storage section 71 to obtain (step S37) the acceleration, and then calculates (step S38) the rotational angle θ based on the acceleration thus obtained. Then, the control section 70 compares the rotational angle θ thus calculated and the rotational angle θ previously calculated in the step S30 with each other to determine (step S39) whether or not the rotational angle θ has changed. When no change has occurred in the rotational angle θ (NO in the step S39), the control section 70 determines (step S40) whether or not a certain time has elapsed from when the change in the rotational angle θ has been detected in the step S31. When the certain time has not elapsed (NO in the step S40), the control section 70 returns to the step S37 to calculate the rotational angle θ based on the acceleration in the three axis directions, and then determines whether or not the rotational angle θ has changed.

Further, when the certain time has elapsed from when the change in the rotational angle θ has been detected in the step S31 (YES in the step S40), the control section 70 redetermines (step S41) the area to which the rotational angle θ calculated in the step S38 belongs. Then, the control section 70 determines (step S42) whether or not the area to which the rotational angle θ has been determined to belong is different from the area to which the rotational angle θ has previously be determined to belong in the step S24. When the area to which the rotational angle θ has been determined to belong is the same as the area to which the rotational angle θ has previously been determined to belong (NO in the step S42), the control section 70 returns to the process in the step S25.

Further, when the area to which the rotational angle θ has been determined to belong is different from the area to which the rotational angle θ has previously been determined to belong (YES in the step S42), the control section 70 obtains (step S43) the angle difference γ between the rotational angle θ calculated in the step S38 and the reference angle in the area to which the rotational angle θ has previously been determined to belong. After the control section 70 obtains the angle difference γ, the control section determines (step S44) whether or not the angle difference γ thus obtained is registered as the margin angle difference γ registered in the correction table 71c. When the angle difference γ thus obtained is registered in the correction table 71c as the margin angle difference γ (YES in the step S44), the control section 70 returns to the step S26 to obtain (step S26) the correction parameter corresponding to the angle difference γ from the correction table 71c, and then performs the processes in the step S27 and the subsequent steps once again.

Further, when the angle difference γ is not registered in the correction table 71c (NO in the step S44), the control section 70 changes the area to which the rotational angle θ belongs to the area redetermined in the step S41, and changes (step S45) the reference angle to the reference angle in the area to which the area which the rotational angle θ belongs to has been changed. Subsequently, the control section 70 obtains (step S46) the angle difference γ between the reference angle in the area to which the area which the rotational angle θ belongs to has been changed and the rotational angle θ calculated in the step S38. Subsequently, the control section 70 makes the transition to the step S26 to obtain (step S26) the correction parameter corresponding to the angle difference γ thus obtained from the correction table 71c, and then performs the processes in the step S27 and the subsequent steps once again.

As described hereinabove, in the second embodiment, when the area to which the rotational angle θ detected belongs has moved from, for example, the first area 81 to the second area 82, it is determined that the rotational angle θ belongs to the first area 81 when the following condition is satisfied. The condition corresponds to when the rotational angle θ is an angle within a range set in advance in the second area 82 from 45° which is the rotational angle θ at the boundary with the first area 81.

Therefore, even when the rotational angle θ runs off the range of the first area 81, it is possible to determine the correction parameter based on the reference angle in the first area 81 as long as the rotational angle θ is within the range set in advance. Therefore, even when the area to which the rotational angle θ belongs is changed, it is possible to provide a margin to the change in the reference angle. Therefore, it is possible to prevent the value of the correction parameter from being dramatically changed, and thus it is possible to prevent the shape of the image from being significantly changed.

Further, in the determination step, the correction parameter is determined based on the difference between the reference angle set in the area to which the rotational angle θ has been determined to belong, and the installation angle detected until the rotational angle θ takes a constant value for a time set in advance.

Therefore, it is possible to prevent the value of the correction parameter from being dramatically changed, and thus it is possible to prevent the shape of the image from being significantly changed during a period in which the operation by the operator continues.

Further, in the determination step, when the rotational angle θ changes once again after the rotational angle θ takes a constant value for the time set in advance, which one of the four areas the rotational angle θ detected belongs to is determined once again.

Therefore, it is possible to correct the shape of the image with the appropriate correction parameter corresponding to the rotational angle θ having changed.

The embodiments described above are nothing more than examples of a specific aspect to which the present disclosure is applied, and therefore, do not limit the present disclosure. Therefore, it is also possible to implement the present disclosure as different aspects.

For example, when rotating the projector 1 around the z-axis direction which is the vertical direction as the rotational axis, it is possible to correct the shape distortion using substantially the same processes. In the first and second embodiments described above, the correction parameter for correcting the distortion in the horizontal direction of the projection image 3 is registered in the correction table 71b, 71c. However, in this case, a correction parameter for correcting the distortion in the vertical direction of the projection image 3 is registered in the correction table 71b, 71c.

Figure 12A:
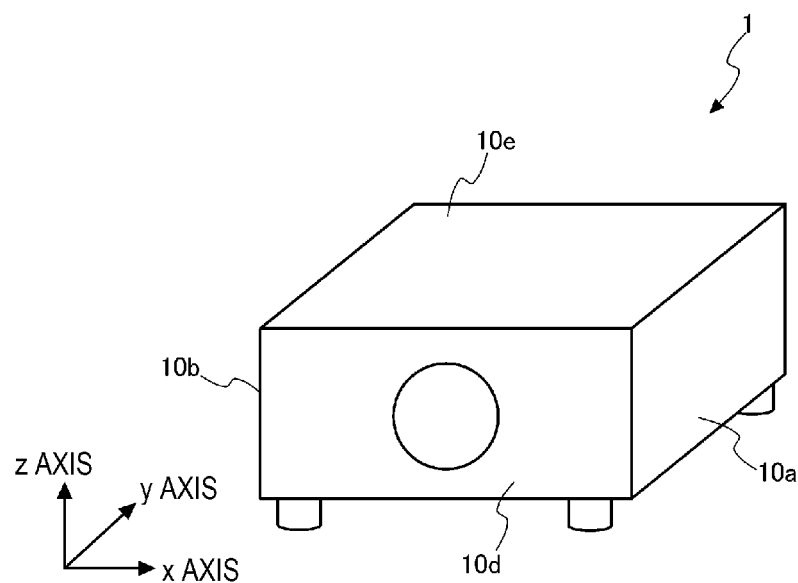
FIGS. 12A, 12B are each a perspective view showing an appearance of the projector.
Figure 12B:
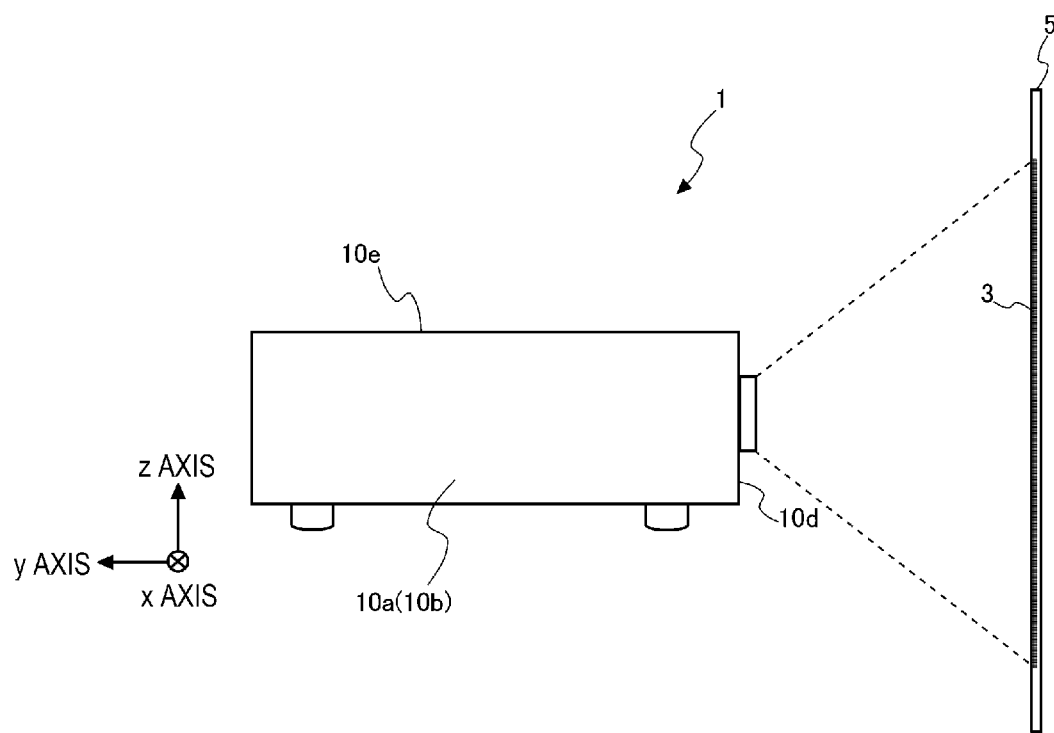
Figure 13A:
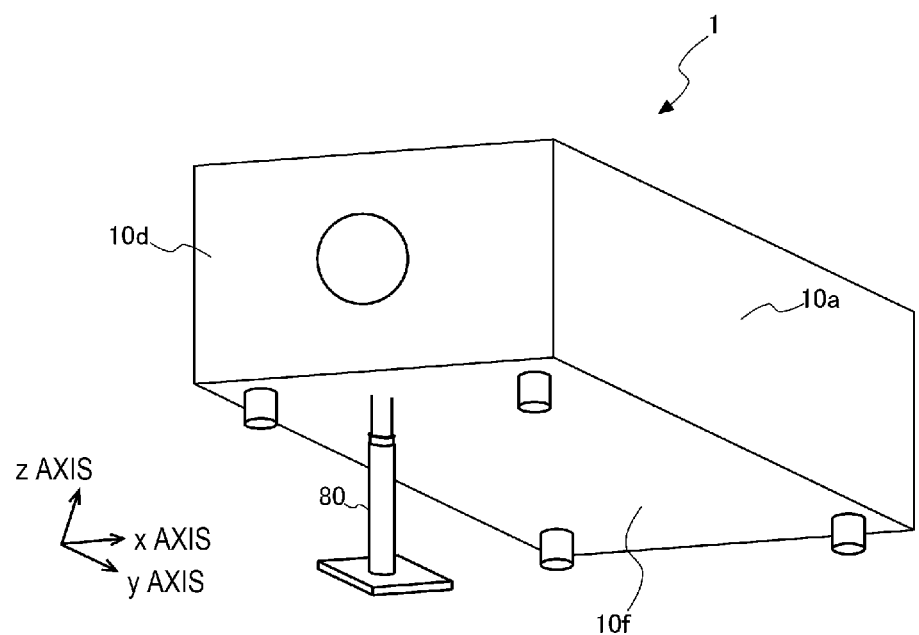
FIGS. 13A, 13B are each a perspective view showing an appearance of the projector.
Figure 13B:
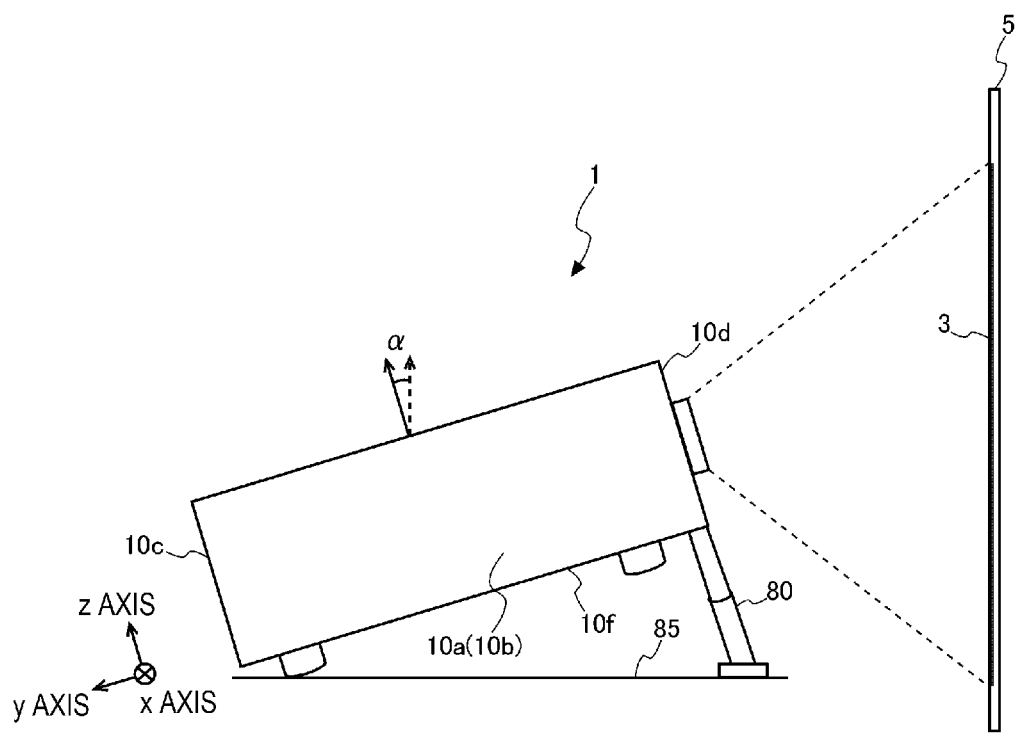

Further, the method of changing the rotational angle θ of the housing 10 can also be other methods than the method shown in FIG. 1 and FIG. 2. FIGS. 12A, 12B and FIGS. 13A, 13B are each a perspective view showing an external appearance of the projector. FIGS. 12A, 12B show when the rotational angle θ of the projector 1 is 0°, namely the z axis faces to the vertical direction, and FIGS. 13A, 13B show when the z axis is tilted as much as an angle α with respect to the vertical direction. Further, FIG. 12A and FIG. 13A each show a diagram of the projector 1 viewed from the front side, and FIG. 12B and FIG. 13B each show a diagram of the projector 1 viewed from the side surface side. On a bottom surface 10f on the front surface 10d side of the housing 10, there is provided a recessed part which a support member 80 can be fitted in. A tip of the support member 80 is fitted in the recessed part to fix the support member 80 to the projector 1. When the projector 1 to which the support member 80 is fixed is installed on an installation stand 85, there is created the state in which the distance between the bottom surface 10f on the front surface 10d side and the installation stand 85 is longer than the distance between the bottom surface 10f on the back surface 10c side and the installation stand 85, and it is possible to set the projector 1 to a tilted state. Further, the support member 80 can be changed in length, and by changing the length of the support member 80, it is possible to change the tilt angle α of the projector 1 with respect to the vertical direction.

Further, in the first and second embodiments described above, it is assumed that 360° as the angle range in which the housing 10 can rotate is the range of the installation angle at which the projector can be installed, but the range of the installation angle can also be an angle other than 360° such as 180° or 270°.

Further, when realizing the control method of the projector using a computer, it is also possible to configure the program to be executed by the computer as an aspect to a recording medium, or an aspect of a transmission medium for transmitting the program. As the recording medium, there can be used a magnetic or optical recording medium, or a semiconductor memory device. Specifically, there can be cited a portable or rigid recording medium such as a flexible disk, an HDD (Hard Disk Drive), a CD-ROM (Compact Disc Read Only Memory), a DVD (Digital Versatile Disc), a Blu-ray disc, a magnetooptic disc, a flash memory, or a card-type recording medium. Further, the recording medium described above can also be a RAM (Random Access Memory) provided to the projector 1, or a nonvolatile storage device such as a ROM (Read Only Memory) or the HDD.

Further, although in the first and second embodiments described above, there is described when the projector 1 performs the processes corresponding to the "detection step," the "determination step," and the "correction step" in the present disclosure, it is also possible to make another device perform at least apart of these steps. As another device, there can be cited, for example, a personal computer coupled to the projector 1.

Further, the processing units of the flowchart shown in each of FIG. 6, FIG. 10, and FIG. 11 are obtained by dividing the process of the control section 70 in accordance with major processing contents in order to make the process of the control section 70 easy to understand. Therefore, the scope of the present disclosure is not limited by the way of the division or the names of the processing units shown in the flowcharts of FIG. 6, FIG. 10, and FIG. 11. Further, the process of the control section 70 can also be divided into a larger number of processing units, or can also be divided so that one processing unit includes a larger amount of process in accordance with the processing contents. Further, the processing sequence of the flowchart described above is not limited to the illustrated example.

Further, the configuration of the projector 1 shown in FIG. 3 is for showing the functional configuration of the projector 1, and specific implementation forms are not particularly limited. In other words, it is not necessarily required to install the hardware corresponding individually to each of the functional sections, but it is obviously possible to adopt a configuration of realizing the functions of the plurality of functional sections by a single processor executing a program. Further, apart of the function realized by software in the embodiments described above can also be realized by hardware, or a part of the function realized by hardware can also be realized by software. Further, the specific detailed configuration of each of other sections of the projector 1 can arbitrarily be modified within the scope or the spirit of the present disclosure.

Further, it is also possible for the light modulation element provided to the light modulation device 33 to adopt, for example, a configuration of using three reflective liquid crystal panels, or to use a system having a liquid crystal panel and a color wheel combined with each other. Alternatively, the present disclosure can be formed of a system using three digital mirror devices, a DMD system having a single digital mirror device and a color wheel combined with each other, or the like. When using just one liquid crystal panel or DMD as the light modulation device, the member corresponding to the combining optical system such as the cross dichroic prism is unnecessary. Further, besides the liquid crystal panel or the DMD, any light modulation device capable of modulating the light emitted by the light source can be adopted without problems.

What is claimed is:

1. A method of controlling a projector, comprising:
   detecting an installation angle of the projector with respect to a reference direction set in advance;
   determining a correction amount of correcting a shape of an image to be projected by the projector based on the installation angle detected;
   correcting the shape of the image based on the correction amount; and
   projecting the image;
   wherein determining the correction amount comprises:
      dividing a range of the installation angle at which the projector is installed into a plurality of areas;
      setting a reference angle for each of four areas divided for projection including a first area that is greater than 315 degrees and less than or equal to 45 degrees, a second area greater than 45 degrees and less than or equal to 135 degrees, a third area greater than 135 degrees and less than or equal to 225 degrees, and a fourth area greater than 225 degrees and less than or equal to 315 degrees;
      determining which area of the first, second, third, and fourth areas the installation angle belongs to and identifying the reference angle associated with the determined area; and
      determining the correction amount based on a difference between the reference angle set in advance in the area to which the installation angle is determined to belong and the installation angle detected.

2. The method of controlling the projector according to claim 1, wherein when the area to which the installation angle is determined to belong moves from the first area to the second area adjacent to the first area, and when the installation angle is an angle within a range set in advance in the second area from the installation angle of a boundary between the first area and the second area, it is determined that the installation angle belongs to the first area.

3. The method of controlling the projector according to claim 1, wherein
when the installation angle is changed, but a time set in advance does not elapse from when the installation angle becomes constant, the correction amount is determined based on the difference between the reference angle set in the area to which the installation angle belongs before the installation angle is changed and the installation angle detected.

4. The method of controlling the projector according to claim 3, wherein
when the installation angle is changed, and a change in the installation angle is detected again after the time set in advance elapses from when the installation angle becomes constant, which area of the first, second, third, and fourth areas the installation angle detected belongs to is redetermined, and the correction amount is determined based on the difference between the first, second, third, or fourth reference angle set in the redetermined area and the installation angle detected.

5. The method of controlling the projector according to claim 1, wherein
an angle at which the correction amount becomes 0 is defined as the reference angle in each of the first, second, third, and fourth areas.

6. The method of controlling the projector according to claim 1, wherein
the correction amount is determined with reference to a table including a difference between the installation angle and the reference angle, and the correction amount corresponding to the difference in association with each other.

7. A projector comprising:
one or more processors programmed to:
  detect an installation angle of the projector with respect to a reference direction set in advance;
  determine a correction amount of correcting a shape of an image to be projected by the projector based on the installation angle detected;
  correct the shape of the image based on the correction amount determined; and
  project the image, wherein the one or more processors determine the correction amount by:
    dividing a range of the installation angle at which the projector is installed into a plurality of areas;
    setting a reference angle for each of four areas divided for projection including a first area that is greater than 315 degrees and less than or equal to 45 degrees, a second area greater than 45 degrees and less than or equal to 135 degrees, a third area greater than 135 degrees and less than or equal to 225 degrees, and a fourth area greater than 225 degrees and less than or equal to 315 degrees;
    determining which area of the first, second, third, and fourth areas the installation angle belongs to and identifying the reference angle associated with the determined area, and
    determining the correction amount based on a difference between the reference angle set in advance in the area to which the installation angle is determined to belong and the installation angle detected.

8. The method of controlling the projector according to claim 1, wherein the first, second, third, and fourth areas comprise areas of equal size.

9. The method of controlling the projector according to claim 1, wherein detecting the installation angle of the projector with respect to the reference direction set in advance is based at least in part on acceleration data in three axis directions.

10. The projector according to claim 7, wherein the range of the installation angle at which the projector is installed is 360 degrees.

* * * * *